Feb. 19, 1929.

C. OMAN 1,702,450

INDUCTION METER

Filed Oct. 28, 1926

WITNESSES:
C.J. Weller.
B.R. King.

INVENTOR
Carl Oman.
BY
Charles L. Barr
ATTORNEY

Patented Feb. 19, 1929.

1,702,450

UNITED STATES PATENT OFFICE.

CARL OMAN, OF SWISSVALE, PENNSYLVANIA, ASSIGNOR TO WESTINGHOUSE ELECTRIC & MANUFACTURING COMPANY, A CORPORATION OF PENNSYLVANIA.

INDUCTION METER.

Application filed October 28, 1926. Serial No. 144,775.

My invention relates to polyphase induction meters and more particularly to motor units for such meters.

My invention has for its object to provide means whereby the motor units of a polyphase induction meter may be adjusted to have similar torque characteristics over corresponding ranges of energization.

A further object of my invention is to provide simple and convenient means for varying the torque characteristics of a motor meter.

A still further object of my invention is to provide a meter of the character indicated that shall be strong and compact in construction and efficient in operation.

A polyphase meter comprises a combination of similar single-phase metering elements, the armature discs of which are mounted on a single shaft or spindle, only one registering mechanism being employed. The total driving torque is the sum of the torques produced by the motor units, and the registration is proportional to the energy passing through all.

For accurate registration, it is necessary that the component motor units shall actuate their respective armatures with equal torque characteristics over corresponding ranges of energization. However, in the manufacture of these elements, it is almost impossible to construct the electromagnetic elements to have similar magnetic characteristics. After assembly, dissimilar magnetic characteristics in the motor units cause the polyphase meter to register inaccurately.

My invention comprises a simple, easily adjustable and novel device by means of which the torque characteristics of the motor units may be made similar after assembly of the units into a polyphase meter.

While my invention is particularly applicable to the accurate operation of polyphase induction meters, it is susceptible of more general application; viz, the accurate operation of single-phase motor meters. In the description of my invention hereinafter set forth, the more general application will be disclosed.

My invention is illustrated in the accompanying drawings, in which

Figure 1:
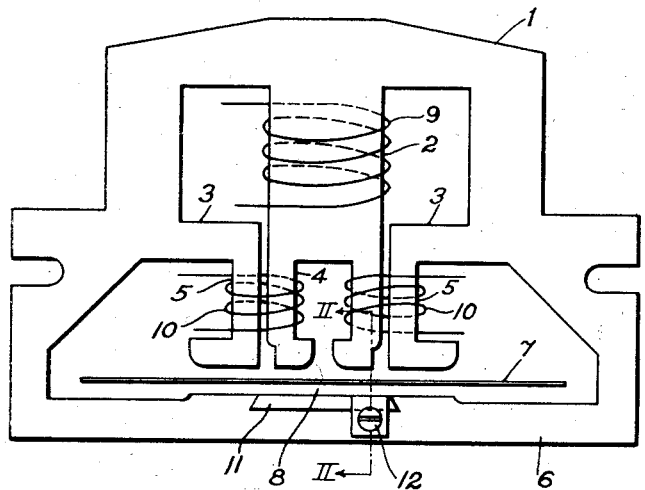
Figure 1 is an elevational view of the electromagnet of a single-phase motor meter constructed in accordance therewith.
Figure 2:
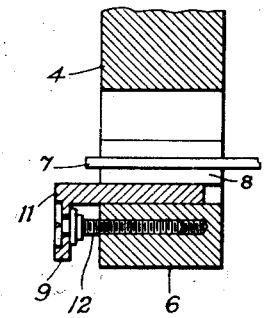
Fig. 2 is a view, in section, on line II—II of Fig. 1.

A core 1 of magnetic laminæ of substantially the form of a hollow rectangle is provided with a central inwardly projecting member 2 and inwardly projecting side members 3. The member 2 is provided with projecting members 4 that cooperate with angular extensions 5 of the members 3 to form a current core. The core 1 has a portion 6 thereof that forms a common path for fluxes threading the member 2 and members 5. A disc 7 is disposed in an air gap 8 between the member 6 and the members 4 and 5 to be acted upon by magnetic fluxes from a potential winding 9 and a current winding 10 disposed respectively thereon.

The magnetic fluxes produced by the windings 9 and 10 cause the armature 7 to develop a torque that is proportional to the product of these two fluxes.

In order to govern the fluxes effecting the rotation of the armature 7 and cause its torque to be proportional to the energy traversing the potential and current windings, I provide a magnetic member 11 of dove-tail shape in the central portion of the return-path member 6. The member 6 is suitably slotted to receive the member 11 that is movable relatively thereto by means of a screw 12.

Varying the position of the magnetic member 11 has the effect of increasing or decreasing the torque-producing fluxes that actuate the armature 7. By merely turning the screw 12, any two single-phase motor meters may be adjusted to have similar torque characteristics over corresponding ranges of energization.

Figure 3:
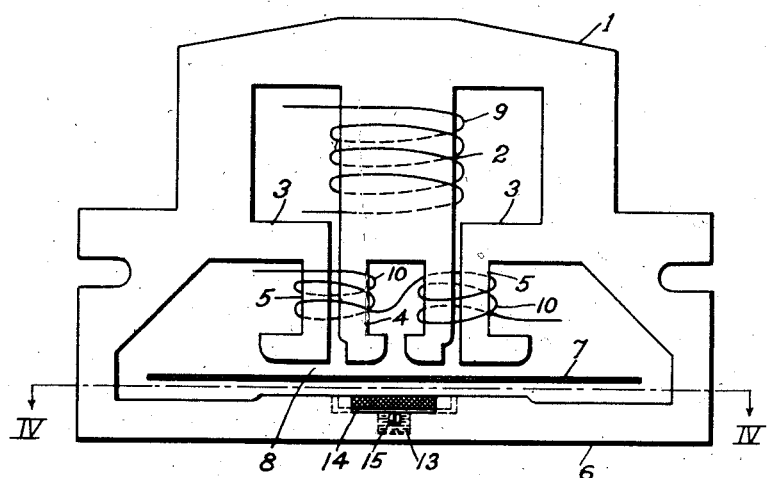
Fig. 3 is an elevational view of a modification of my invention.
Figure 4:
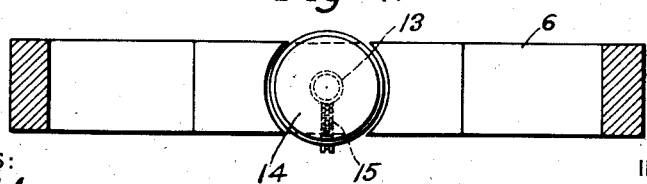
Fig. 4 is a view, in section, on line IV—IV of Fig. 3.

In Figs. 3 and 4, I show another modification for obtaining the same result. The return-path member 6 is drilled and threaded in its central portion to receive a screw 13 secured to a keeper 14. A set screw 15 is provided in the return-path member 6 to frictionally engage the screw 13 and lock it in any desired position.

In order to make the torques of the motor units of a polyphase meter equal, the set screw 15 is turned out of engagement with the screw 13 and the keeper 14 is then moved inwardly or outwardly, as the case may be, by turning the screw 13 in the proper direction, until the torques of the motor units are made equal. The set screw 15 is then turned to engage the screw 13 and hold it in the position to insure maintenance of a substantially constant torque of the units.

In practicing my invention, I prefer to place the adjustable magnetic member in the central portion of the return-path member in order to effect a symmetrical distribution of the lines of force. The adjustable magnetic member may be placed, however, in any position in the return-path member without seriously affecting the operation of my invention.

Since various other modifications may suggest themselves to those skilled in the art without departing from the spirit of my invention, I desire to include all such modifications within the scope of the appended claims.

I claim as my invention:

1. A motor meter comprising a magnetizable core having a central downwardly projecting member, inwardly projecting side members having angular extensions separated from the central member by air gaps, and a bottom member having a recess, a magnetizable dove-tail member for said recess, and means for moving the said dove-tail member relatively to the said bottom member.

2. A motor meter comprising a magnetizable core having inwardly projecting members separated by air gaps and a bottom member separated from the said projecting members by an air gap, a magnetic keeper mounted on said bottom member, and means for moving the said keeper relatively to the said bottom member.

3. A motor meter comprising a magnetizable core of substantially the shape of a hollow rectangle, a bottom portion thereof having a recess, a magnetizable dove-tail member for said recess, and means for moving the said dove-tail member with respect to the said bottom member to thereby change the driving torque of said meter.

4. A motor meter comprising a voltage field member and a current field member, a common flux return-path member therefor having a recess in its central portion, an adjustable magnetic member movable in said recess, and a screw linking the return-path member with the adjustable member for changing the driving torque of said meter.

In testimony whereof, I have hereunto subscribed my name this 26th day of October, 1926.

CARL OMAN.